Jan. 26, 1954  G. W. HART  2,667,634
MOVING TARGET INDICATION APPARATUS
Filed Nov. 10, 1948
FIG. 1.
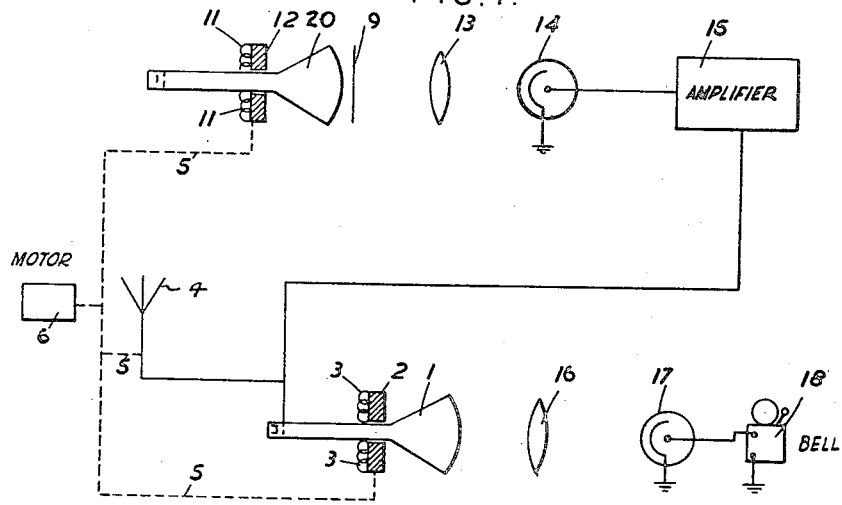
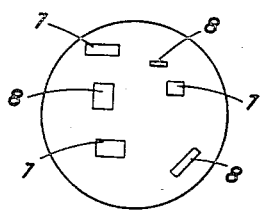
FIG. 2.
FIXED AND MOVING OBJECTS
SEEN on SCREEN of TUBE 1,
WHEN THE INVENTION IS
NOT EMPLOYED.
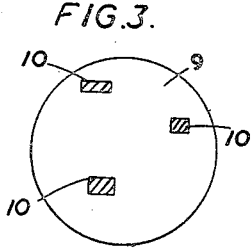
FIG. 3.
TRANSPARENCY WITH
OPAQUE AREAS 10,
CORRESPONDING TO FIXED
OBJECTS 7 of FIG. 2.
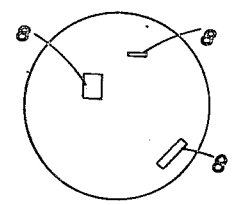
FIG. 4.
ONLY MOVING OBJECTS 8,
SEEN ON SCREEN of TUBE 1,
WHEN THE INVENTION IS
EMPLOYED.
Inventor
GEOFFREY WALTER HART
By Ralph E. Atherton
Attorney Patented Jan. 26, 1954

2,667,634

UNITED STATES PATENT OFFICE 2,667,634

MOVING TARGET INDICATION APPARATUS

Geoffrey Walter Hart, Stoke Poges, England, assignor to Electric & Musical Industries Limited, Hayes, England, a company of Great Britain Application November 10, 1948, Serial No. 59,309

Claims priority, application Great Britain November 15, 1947

2 Claims. (Cl. 343—7.7)

This invention relates to radiolocation apparatus of the well-known type incorporating a plan position indicator for providing a display indicating the positions of objects in a field explored by means of a rotating or swinging antenna. In many uses of apparatus of this type it is required only to discern some objects, for example moving or movable objects, or to distinguish such objects readily from some other objects, for example fixed objects. For example, the apparatus may be used on an airfield for the purpose of detecting the presence or position of aircraft, motor vehicles or the like movable objects on the airfield. However, fixed objects, for example hangars and offices, are represented in said display as well as other objects such as moving or stationary aircraft, and difficulty may be encountered in readily identifying those parts of the display which represent the non-fixed objects, particularly if the fixed objects are large or numerous.

The object of the invention is to provide apparatus of the type referred to whereby the effect of certain objects on the display can be reduced or eliminated.

According to the invention, radio location apparatus is provided incorporating an angularly movable antenna for receiving signals reflected from objects in the field explored by said antenna, a plan position indicator responsive to said signals for providing a display indicating the positions of said objects, a material representation indicating selected objects only in said field, means for producing signals representative of said selected objects and means for causing said signals representative of said selected objects to vary the magnitude of signals representing said selected objects as received by said antenna, thereby to differentiate on said plan position indicator representations of said selected objects from representations of other objects.

The signals produced from said material representation may, for example, be obtained by optically scanning a transparency in which those areas which correspond to said selected objects are opaque and other areas are clear whereby the scanning apparatus produces an output which varies in accordance with the opaqueness or transparency of the scanned areas.

In order that the said invention may be clearly understood and readily carried into effect, the same will now be more fully described with reference to the accompanying drawing, in which:

Figure 1 is a diagrammatic representation of apparatus according to the invention applied to apparatus of the type known as a plan position indicator (P. P. I.), Figure 2 represents a P. P. I. display obtained without the employment of the invention, Figure 3 represents a transparency, and Figure 4 represents a P. P. I. display obtained when the transparency of Figure 3 is employed.

Referring to the drawing, reference numeral 1 indicates the cathode ray tube of a P. P. I. apparatus. The details of construction of said apparatus will be understood by those familiar with the art, and the apparatus will accordingly be described only to the extent necessary for explaining the present invention. Around the neck of the cathode ray tube 1 is mounted a carrier 2 on which are mounted deflection coils 3, carrier 2 being coupled to an angularly movable antenna 4, by gearing represented by the broken lines 5, whereby as the antenna 4 is rotated or moved angularly under the action of a driving motor 6 carrier 2 is moved in synchronism with the antenna so that the radial trace produced on the tube screen by the deflection of the beam by coils 3 is caused to move angularly on said screen. The signals received by antenna 4 by reflection from objects in the field scanned by the antenna are applied to the control electrode of tube 1, thereby modulating the cathode ray beam to produce a display indicating the positions of said objects. Figure 2 represents the display by way of example, objects in the explored field being represented by bright marks 7 and 8 on an otherwise dark background. It will be assumed that the marks 7 represent fixed objects and that the marks 8 represent moving or movable objects. In order to remove the marks 7 partly or completely from the presentation, a transparency 9 is prepared, having opaque areas 10 corresponding to the marks 7, i. e., it represents the presentation which would be produced if only the objects corresponding to marks 7 were present in the explored field. Transparency 9 may for example be prepared by a photographic process from a suitable display exhibited by the P. P. I. apparatus, for example the display exhibited when only the fixed objects are in the explored field. The transparency 9 is mounted close to or on the screen of a second cathode ray tube 20, Figure 1, the beam of which is arranged to produce an angularly moving radial trace under the action of deflection coils 11 mounted on a carrier 12 which is moved angularly through the intermediary of gearing 5 coupling carrier 12 with the driving motor 6, so that the screen of tube 20 is scanned in synchronism with the scanning of the screen of tube 1. The beam of tube 20 is not modulated, so that the beam produces a moving light spot of constant brightness on the screen of tube 20. Light from said spot passes through transparent parts of transparency 9 and is focussed by an optical device 13 on to the cathode of a photo-electric tube 14. The light from said spot is however cut off by the opaque areas of transparency 9. As the spot moves over the screen of tube 20 a voltage is generated by tube 14 which depends on the light reaching said device and which accordingly is substantially constant during the scanning of the parts of the tube screen adjacent transparent parts of the transparency but which drops to zero when parts of the tube screen adjacent opaque areas of transparency 9 are being scanned. The output of tube 14, which thus comprises negatively directed signals, is applied to an amplifier 15, the output from which is applied to the control electrode of tube 1 in such sense that said signals oppose the signals produced by reflection from the fixed objects in the explored field, so that said objects are not visible in the display on the screen of tube 1 or are less visible than they would otherwise be. Objects within the field explored by the radar apparatus and not represented on transparency 9 will continue to be represented on the P. P. I. screen, as shown by Figure 4, wherein only the marks 8 appear, the marks 7 of Figure 2 having been suppressed by the use of the transparency 9.

It will be appreciated that if only those objects are in the field explored which were in said field when said transparency was made, the P. P. I. screen will give no display. If however a corresponding object then enters the field, an area of the screen will be illuminated. Said illumination of the screen may be utilised to operate light-sensitive means whereby an audible or other warning is given when an object enters the explored field. Such an arrangement may for example be employed for giving warning of unauthorised persons entering an area, for example the perimeter of an airfield.

This application of the invention is shown in Figure 1, in which the light from the screen of tube 1 is arranged to be focussed by optical means 16 on to the cathode of a photo-represented at 17 connected to an electric bell electric tube 17 connected to an electric bell 18, so that the bell is operated whenever said screen is illuminated.

What I claim is:
1. Radiolocation apparatus incorporating an angularly movable antenna for receiving signals reflected from objects in the field explored by said antenna, a first cathode ray tube, means for deflecting the beam of said tube to scan the screen of said tube, means responsive to said signals for modulating said beam to provide a display representing the positions of said objects, a second cathode ray tube, means for deflecting the beam of said second tube in synchronism with the beam of said first tube to produce a moving light spot on the screen of said second tube, a material representation indicating selected objects only in said field and disposed to be scanned by said light spot, a photoelectric device disposed for exposure to light from said material representation to generate signals corresponding to said selected objects, and means responsive to said last-mentioned signals for varying the amplitude of signals corresponding to said selected objects received by said antenna to differentiate in said display representations of said selected objects from representations of other objects.

2. Radiolocation apparatus according to claim 1, said representation having areas representing said selected objects and of different opacity from the remainder of said representation.

GEOFFREY WALTER HART.

References Cited in the file of this patent
UNITED STATES PATENTS

| Number | Name | Date |
| --- | --- | --- |
| 2,406,751 | Emerson | Sept. 3, 1946 |
| 2,412,669 | Bedford | Dec. 17, 1946 |
| 2,437,173 | Rutherford | Mar. 2, 1948 |
| 2,440,301 | Sharpe | Apr. 27, 1948 |
| 2,492,012 | Smith | Dec. 20, 1949 |
| 2,522,528 | McNally | Sept. 19, 1950 |
| 2,526,682 | Mulberger et al. | Oct. 24, 1950 |
| 2,586,772 | Ashby | Feb. 26, 1952 |
| 2,597,636 | Hall | May 20, 1952 |

FOREIGN PATENTS

| Number | Country | Date |
| --- | --- | --- |
| 614,595 | Great Britain | July 2, 1947 |
| 632,689 | Great Britain | Nov. 28, 1949 |